Oct. 21, 1941.  J. A. HOYT  2,259,642
ROPE PULLER
Filed Nov. 6, 1939
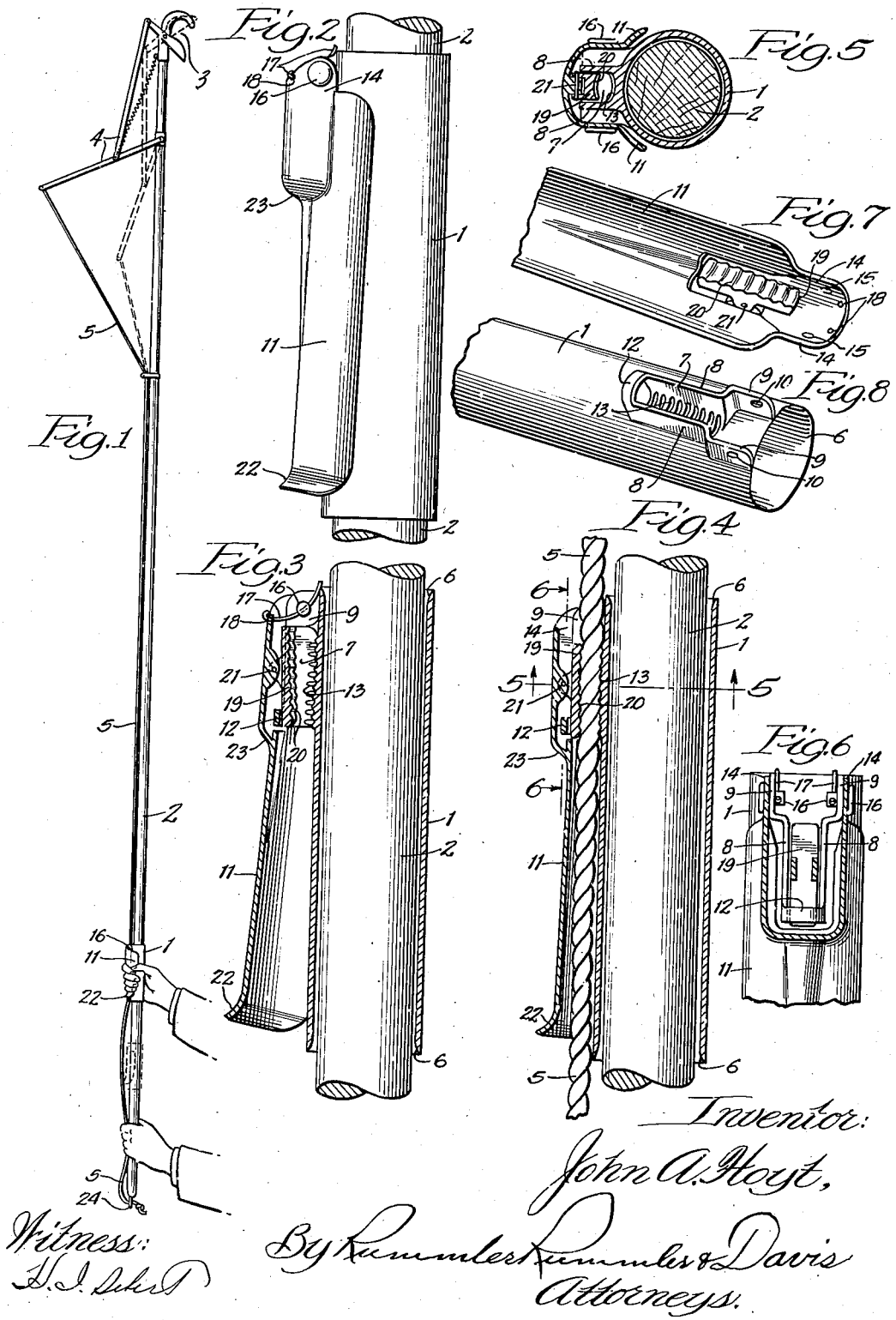

Patented Oct. 21, 1941

2,259,642

UNITED STATES PATENT OFFICE 2,259,642

ROPE PULLER

John A. Hoyt, Batavia, Ill., assignor of one-third to John F. Fonder, Evanston, Ill., and one-third to James A. Hoyt, Chicago, Ill.

Application November 6, 1939, Serial No. 303,123

6 Claims. (Cl. 30—249)

This invention relates to rope gripping devices and particularly a type of such devices that is adapted for use on pruners and analogous horticultural implements mounted on poles and operated by a pull cord.

The main objects of this invention are to provide an improved form of rope grip for pruners, fruit pickers, and analogous implements that will be readily slidable along the pole and the rope of the implement, serving as a handle for supporting and manipulating the pole, and having its grip on the rope controlled by varying the pressure of the operator's hand; and to provide a device of this kind that will enable the operator to quickly adjust the effective length of the pole and operate the implement at any such length without releasing his grasp on the rope-pulling handle.

A primary object is to provide improved means for gripping the operating element in any arrangement embodying the use of a pole, tube or the like to support an implement in conjunction with a rope, cord or rod for actuating the implement.

A specific embodiment of this invention is shown in the accompanying drawing in which:

Figure 1 is an elevation of a pruner equipped with a rope puller constructed according to this invention and illustrating the manner in which the device is manipulated by the hands of an operator.

Fig. 2 is a side elevation of the rope-pulling grip or handle.

Fig. 3 is a view corresponding to Fig. 2 in which the parts of the rope puller are shown in section.

Fig. 4 is a corresponding sectional view illustrating the manner in which the gripping jaws engage the rope.

Fig. 5 is a section taken on the line 5—5 of Fig. 4.

Fig. 6 is a detail view partly in section on the line 6—6 of Fig. 4.

Figure 7 is a fragmentary inside view of the clamp lever.

Figure 8 is a fragmentary perspective view of the end portion of the sleeve-like body upon which the clamp lever is pivoted.

The principal constituents of the device shown are a body 1, preferably in the form of a sleeve of appropriate dimensions to be grasped by the hand of an operator and to be slidable on the pole 2 of an implement, such as the pruner illustrated in Figure 1, which is shown as carrying at its end pruning shears 3 actuated by a system of levers 4 operated by a rope or pull cord 5, the body 1 being equipped with a suitable rope-engaging clamp that is readily controlled for gripping or releasing the rope by the hand of the operator which grasps the body 1.

In the form shown, the body 1 is a sleeve with an internal diameter slightly larger than the diameter of the pole 2 and with its end margins 6 internally beveled, or flared, so as to prevent it from injuring the surface of the pole.

As illustrated in Figure 8, a rope guideway 7 is formed on one side of the sleeve 1 and is preferably in the form of an open channel extending longitudinally of the sleeve and having side walls 8 with wings 9 having apertures 10 at which a clamp lever 11 is pivoted. In the form shown in Figure 8, the walls 8 are connected by a bridge portion 12 and the bottom of the guideway 7 is roughened by corrugations 13.

The lever 11 is arcuate in transverse form so as to embrace the adjacent portions of the sleeve 1 and is provided with spaced ears 14 with pivot apertures 15, whereby it is pivotally mounted on the sleeve by means of pins 16 which pass through the apertures 15 and 10 and are held in place by cotters 17 which, in the form shown, as illustrated in Figure 3, pass through apertures 18 in an adjacent part of the lever and function as springs to normally relax but lightly urge the clamp jaws into frictional engagement with the rope.

The lever 11 carries a clamp jaw 19 that is positioned between the walls 8, as shown in Fig. 5, and has a corrugated rope gripping surface 20 opposite to the surface or jaw 13.

The jaw 19 is preferably pivoted at 21 on a lug formed on the inner surface of the lever 11 and extends beneath the bridge 12 which serves as a limit stop for the tilting of the jaw 19. The lever 11 is flared outwardly at its extremity to form a shoulder 22 and adjacent its pivoted end there is also formed a shoulder 23. These shoulders engage parts of the operator's hands when the sleeve 1 and lever 11 are lightly grasped by such hand and facilitate the shifting of the sleeve along the pole and rope.

The operation of the device is as follows:

The rope 5 which operates the pruner, or other implement carried by the pole, is threaded through the rope guide 7 between the jaws 13 and 19 and its end may be fastened to the pole, as illustrated in Figure 1, by passing it through an eye 24 and knotting it. The pole is held in the hands of the operator, as shown in Fig. 1, and can be adjusted to any effective length by shifting the sleeve 1 to a suitable place along the pole.

One hand of the operator grasps the rope-pulling device in such a way that the operator's fingers overlap the lever 11 and thereby control the pressure of the clamp jaws so that they will tightly grip the rope and enable the latter to be pulled by shifting the sleeve downwardly on the pole or will be partly released so as to be held only in light frictional engagement with the rope by the springs 17 and enable the pulling device to be shifted along the pole and rope in either direction without effectively pulling the rope. The purpose of this light frictional engagement is to hold the sleeve in any position of adjustment by its friction with the rope when the operator releases his grasp thereon.

Although but one specific embodiment of this invention is herein shown and described, it is to be understood that numerous details of the construction shown may be altered or omitted without departing from the spirit of the invention as defined by the following claims.

I claim.

1. A rope puller, comprising a sleeve formed to slide on a pole, a guideway for a rope along one side of said sleeve, and a rope clamp carried by said sleeve and operative by an operator's hand while gripping said sleeve for pulling such rope.

2. A rope puller, comprising a body formed to slide on a pole, a rope guide on said body, and a lever pivoted on said body and having a jaw normally relaxed and coacting with said rope guide to clamp a rope to said body when gripped by the operator's hand to pull the rope.

3. A tool comprising a pole, an implement carried thereby, a pull rope extending along said pole for actuating said implement, a sleeve slidable along said pole, and a normally relaxed clamp on said sleeve to engage and pull said rope when gripped by the operator's hand, said rope being extended along and secured to the pole behind said clamp.

4. A tool comprising a pole, an implement carried thereby, a pull rope extending along said pole for actuating said implement, and a sleeve slidable along said pole, said sleeve having a guide for said rope, having a clamp to grip said rope, and having means normally relaxed and operable through the grip of an operator's hand on said sleeve to actuate said clamp, said rope being extended along said pole behind said clamp.

5. A rope puller comprising a sleeve, a lever disposed along said sleeve and pivotally mounted thereon, and means for guiding a rope outside of said sleeve and between said sleeve and lever and including coacting clamp jaws normally relaxed and positioned to grip such rope when said sleeve and lever are gripped by an operator's hand.

6. A rope puller comprising a sleeve, a lever disposed along said sleeve and pivotally mounted thereon, means for guiding a rope between said sleeve and lever and including coacting clamp jaws positioned to engage such rope when said sleeve and lever are gripped by an operator's hand, and a spring normally controlling said jaws when released by the operator's hand.

JOHN A. HOYT.